July 17, 1951     A. V. BEDFORD ET AL     2,560,918
INTERMITTENT FILM ADVANCING MECHANISM
UTILIZING AIR PRESSURE
Filed March 22, 1949
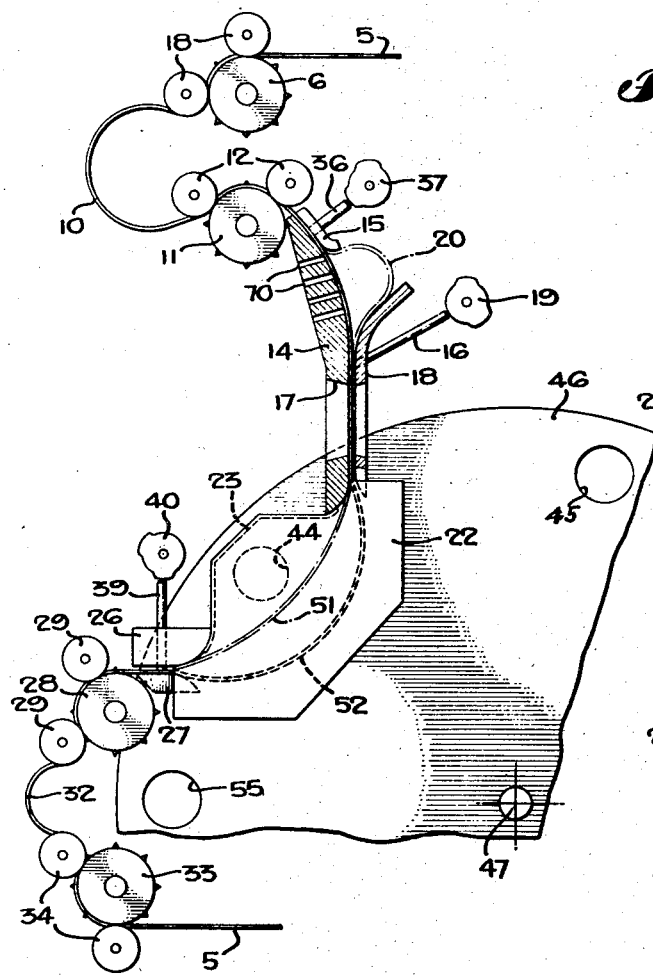
Fig. 1.
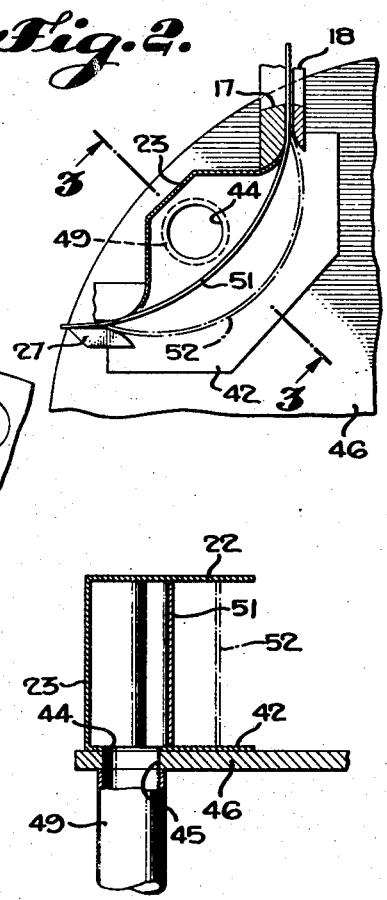
Fig. 2.
Fig. 3.
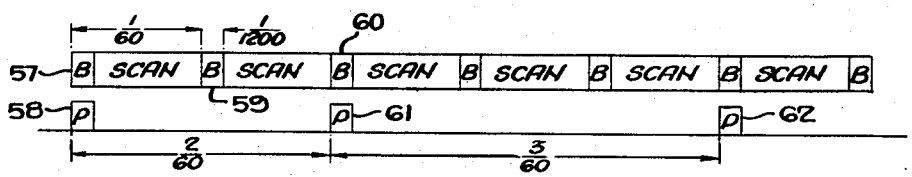
Fig. 4.
ALDA V. BEDFORD
RANDALL C. BALLARD
INVENTORS
BY
ATTORNEY Patented July 17, 1951

2,560,918

UNITED STATES PATENT OFFICE 2,560,918

INTERMITTENT FILM ADVANCING MECHANISM UTILIZING AIR PRESSURE

Alda V. Bedford, Princeton, and Randall C. Ballard, Trenton, N. J., assignors to Radio Corporation of America, a corporation of Delaware Application March 22, 1949, Serial No. 82,866

4 Claims. (Cl. 88—18)

This invention relates to motion picture film apparatus, and particularly to a motion picture film projector having an intermittent pull-down mechanism with extremely short pull-down periods.

It is well-known, in the projection of motion pictures, that the film is advanced into and out of the projection aperture intermittently, the film being stationary during the period when the image on the film is projected to an observation medium, and the light eliminated from the observation medium during the period when one frame is taken from the aperture and the next succeeding frame substituted therefor. Normally, the light is eliminated by the use of a shutter having at least one cover blade and one or more interrupting blades to reduce flicker effect. The present invention is directed to an intermittent pull-down mechanism which is so rapid that, not only is it possible to project the image for a longer period of time, but it is unnecessary to employ a shutter for the normal projection of pictures.

Also, by providing such a short pull-down period, the projector is particularly useful in the televising of motion picture film by the flying spot method. It is well-known that standard motion pictures are photographed at the rate of twenty-four frames per second, and, since television scanning is at the rate of sixty fields per second, alternate frames are scanned twice and the other frames are scanned three times, two fields being required to completely scan a motion picture frame. In this manner, the proper synchronism between a twenty-four frame per second motion picture and a sixty field per second television scanning rate is obtained. However, with normal types of intermittent mechanisms, the period of pull-down is too long to permit a film frame to be changed during the television vertical blanking period. For instance, the double scanning of one frame occupies a time period of about .032 second, and the triple scanning of the subsequent frame occupies a time period of about .049 second. Now, if the film pull-down time can be accomplished in one-thousandth of a second, this time period is short enough to be within the vertical blanking period. That is, the film will be pulled down during the time period that the television scanning spot is blanked out. This rapid movement of the film cannot be readily accomplished with normal claw or sprocket type pull-down mechanisms in view of the excessive force required on the film between the sprocket holes. In the present invention, the desired speed is obtained by utilizing a blast of high-pressure air which is applied to the surface of a section of the film which has been advanced into an upper loop a frame long during the relatively long scanning periods. The blast of air eliminates the supply or upper loop and forms a take-up or lower loop, which is advanced to the supply reel during another scanning period.

The principal object of the invention, therefore, is to facilitate the intermittent positioning of the frames of a motion picture film in a projection aperture.

Another object of the invention is to provide an improved pull-down mechanism for a motion picture projector.

A further object of the invention is to provide an improved means for rapidly changing picture frames on a motion picture film in a projection aperture by the use of a blast of high-pressure air intermittently applied to the film.

A still further object of the invention is to provide an improved type of intermittent film mechanism which provides a pull-down time of the order of one-thousandth of a second.

Although the novel features which are believed to be characteristic of this invention will be pointed out with particularity in the appended claims, the manner of its organization and the mode of its operation will be better understood by referring to the following description, read in conjunction with the accompanying drawings, forming part hereof, in which:

Fig. 1 is an elevational view, partly in cross-section, of the film pull-down mechanism embodying the invention.

Fig. 2 is a detailed view of the lower loop forming portion of the intermittent mechanism of the invention.

Fig. 3 is a detailed view of the air ports taken along the line 3—3 of Fig. 2, and Fig. 4 is a chart showing the relative operation times of the various elements of the mechanism in relation to a television scanning system.

Referring now to the drawings, in which the same numerals identify like elements, the path of a motion picture film 5 is shown passing over a continuously rotating sprocket 6, having pad rollers 8, into a loop 10. The film from the loop 10 is intermittently advanced by a sprocket 11, having pad rollers 12, and fed between the film guiding end of an aperture plate 14 and a cooperating film guide 15. When the film is held stationary in a film aperture 17 either by a clamp 16 actuated by a cam 19, or simply by the friction of a pressure plate 18 on the film, the sprocket 11 will advance the film one frame and form it into a loop 20. From the aperture 17, the film passes through a chamber made up of side walls 22 and 42 and a back closure wall 23, and then between film guides 26 and 27 to an intermittent sprocket 28, having pad rollers 29. From the intermittent sprocket 28, the film passes into a loop 32, then to a continuously rotatable sprocket 33, having pad rollers 34.

Passing through the guide 15 is a clamp rod 36 actuated by a cam 37 similar to clamp and cam 16—19. A similar clamp 39 and cam 40 are provided just prior to the film reaching intermittent sprocket 28. The clamps 16, 36, and 39 may contact the film along its edge or along a narrow strip between adjacent frames to prevent scratching of the picture. Although a clamp is shown at the aperture 17 to hold the film stationary in the aperture, the friction between the gate guide or shoe 18 and the gate plate 14 may be sufficient for this purpose.

As mentioned above, the film passes between the walls 22 and a wall 42, a chamber being formed by the walls 22, 23, 42, and the film. The wall 42 has a port 44 therein with which an aperture, port, or opening 45 in a rotatable disc 46 will periodically coincide when the disc is rotated about an axis 47. Aligned with the aperture 44 is an air duct 49 which is connected to an air pressure chamber, not shown. Thus, when the disc 46 is rotated to the point where the aperture 45 therein coincides with the aperture 44, air will be admitted to the chamber and the film will be blown outwardly from the position shown at 51 to the position shown at 52. The disc 46 is also provided with a second aperture, such as shown at 55, to provide a pull-down at unequal time periods, as will be described in connection with the chart in Fig. 4.

As mentioned above, not only should the pull-down period be of a duration comparable to the blanking period, which is of the order of one-thousandth of a second, but should occur aperiodically; that is, the first pull-down period should start two-sixtieths of a second after the last pull-down, and the next pull-down period should occur three-sixtieths of a second later, these periods being repeated as the film is televised. One of the means of accomplishing this result is to circumferentially space the ports 45 and 55 in a three to two ratio.

Referring now to the chart and Fig. 1, the operation of the system is explained when designed to serve in a flying spot television scanning system. Starting at the beginning of a blanking period 57, which is of the order of one-twelve-hundredths of a second, the film is pulled down during this blanking period, as shown at 58. The remaining one-sixtieth of a second is used for scanning one field. The second blanking period 59 then occurs during one-twelve-hundredths of a second, and the frame is again scanned during the remaining portion of the one-sixtieth of a second period. Thus, a motion picture frame is advanced into the aperture 17 and scanned twice in two-sixtieths of a second. During the next blanking period 60, the film is again pulled down, as shown at 61, following which, the next frame is scanned three times before the next pull-down period 62, this period requiring three-sixtieths of a second. Thus, the two frames are advanced in one-twelfth of a second, or one frame in one-twenty-fourth of a second, which is the correct motion picture speed.

To obtain this type of operation, the two ports 45 and 55 are correspondingly spaced in the disc 46, and the intermittent sprockets 11 and 28 and the clamps 36 and 39 are operated at the proper time periods. For instance, assuming the film is in the position shown at 51 and 20 at the beginning of the chart in Fig. 4. At this instant, the aperture 55 is in alignment with aperture 44 and air is applied against the film. This action blows the film from its position 51 to its position 52, which eliminates the loop 20 and moves the film into contact with the curved surface of the member 14. At this instant also, the clamps 15 and 39 are applied against the film to hold it fixed at these points, and if clamp 16 is used, it is released so that the film may be pulled through the gate overcoming the friction between the members 14 and 18. Now, during the next two scanning periods, the clamps 36 and 39 are released, the clamp 16 applied if used, and the intermittent sprockets 11 and 28 rotated to feed one frame length of film into the loop 20 and to remove one frame length of film from the loop 52. The clamps 36 and 39 are then applied, and when the next aperture 45 aligns itself with aperture 44 at point 61, as shown in the chart in Fig. 4, another frame of film will be advanced into the aperture 17. Because of the three to two spacing of the actuating portions of the cams 19, 37, and 40 and the intermittent drive for sprockets 11 and 28, the next pull-down will occur three-sixtieths of a second later, the same action being repeated as has just been described. Thus, one frame will be advanced in one-twelve-hundredth of a second of a two-sixtieths second period, and the next frame will be advanced in one-twelve-hundredth of a second of a three-sixtieths second period, which provides the proper rate of pull-down to permit television scanning of twenty-four frame per second motion picture film by the flying spot method. It is to be noted that when the pull-down mechanism is designed for normal motion picture projection, the apertures 45 and 55 may be uniformly spaced, only one being necessary if the disc 46 is rotated at the desired speed. The action of the cams 19, 37, and 40 and the action of intermittent sprockets 11 and 28 will also be uniformly timed.

To provide a braking action to the film as the loop 20 is eliminated, the gate member 14 is curved and is provided with openings 70, which allow the air to escape gradually at a predetermined rate. This prevents film "slap" or too rapid a stop, which might damage the film. At the lower loop 52, the entrapped air will leak out through the sprocket holes after the air from duct 49 is cut off. Instead of the disc 46, a slide type of valve driven by a cam could be used. Furthermore, the ports or apertures 45 and 55 could be a series of small holes to correspond with the series of holes in the aperture 44 to provide a more rapid valve opening and closing for a small motion of the disc 46 or of a slide valve. Also, more ports, such as shown at 45 and 55, could be used with the proper speed of rotation of the disc 46.

We claim:

1. An intermittent film advancing mechanism comprising a first intermittent sprocket, a first film clamp adjacent said sprocket, a film gate, a second intermittent sprocket, a second film clamp adjacent said second sprocket, said clamps being positioned between said sprockets and said gate being positioned between said clamps, said sprockets being rotatable simultaneously to form a film loop between said gate and said first clamp and to remove a film loop between said gate and said second clamp, an air source, and a valve to control the directing of air from said source against the film to form a loop between said gate and said second clamp and to remove a loop between said first clamp and said gate when said sprockets and clamps are stationary.

2. An intermittent film advancing mechanism in accordance with claim 1, in which said valve is a disc with openings therein unequally spaced, said disc being driven at a constant angular speed.

3. An intermittent film advancing mechanism in accordance with claim 1, in which said valve is an apertured rotary member having openings spaced to open said valve in alternate periods of substantially $2/60$ and $3/60$ of a second time periods, and advancing said film in approximately $1/1000$ of a second.

4. An intermittent film mechanism in accordance with claim 1, in which loop controlling means are provided, said means including a curved plate against which said film in said first mentioned loop is brought into contact, said plate having a plurality of apertures therethrough to control the rate at which said film is brought into contact with said plate.

ALDA V. BEDFORD.
RANDALL C. BALLARD.

REFERENCES CITED

The following references are of record in the file of this patent:

UNITED STATES PATENTS

| Number | Name | Date |
|---|---|---|
| 960,794 | Bingham | June 7, 1910 |
| 1,244,920 | Thomas | Oct. 30, 1917 |
| 1,309,471 | Evans | July 8, 1919 |
| 1,393,735 | Anselmi et al. | Oct. 18, 1921 |

FOREIGN PATENTS

| Number | Country | Date |
|---|---|---|
| 10,266 | Great Britain | of 1915 |